(12) United States Patent
Gong et al.

(10) Patent No.: US 8,576,559 B2
(45) Date of Patent: Nov. 5, 2013

(54) EXTRACTING APPARATUS FOR STORAGE MODULE

(75) Inventors: Xin-Hu Gong, Shenzhen (CN); Lian Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 210 days.

(21) Appl. No.: 13/220,713

(22) Filed: Aug. 30, 2011

(65) Prior Publication Data
US 2012/0320521 A1    Dec. 20, 2012

(30) Foreign Application Priority Data
Jun. 17, 2011 (CN) .......................... 2011 1 0163341

(51) Int. Cl.
*G06F 1/16* (2006.01)
(52) U.S. Cl.
USPC .. 361/679.38; 248/688; 345/589; 312/334.46
(58) Field of Classification Search
USPC ........... 248/121, 286.1, 157, 688, 278.1, 611; 361/679.59, 679.34, 679.06, 679.54, 361/679.01, 679.28, 679.17, 679.55, 361/679.41, 679.27, 679.23, 679.58, 361/679.15, 679.22; 345/158, 420, 655, 345/589, 156, 168, 169, 1.1, 173, 174; 439/66, 67, 354; 312/334.1, 323, 312/293.1, 237, 319.2, 223.1, 223.2, 334.46
See application file for complete search history.

(56) References Cited

U.S. PATENT DOCUMENTS

2011/0114808 A1* 5/2011 Huang et al. .................. 248/305
2012/0262856 A1* 10/2012 Yu ............................ 361/679.01

* cited by examiner

*Primary Examiner* — Hung Duong
(74) *Attorney, Agent, or Firm* — Altis & Wispro Law Group, Inc.

(57) ABSTRACT

An extracting apparatus for a storage module includes a bracket and a holder. The bracket includes a fastener. The holder is withdrawable mounted to the bracket. The holder is for fixing the storage module. The holder includes a handle. The handle includes an arm pivotably connecting with the holder and an operating portion pivotably connecting with the arm. The operating portion is operated to fold to abut the arm, and the fastener latching the handle to fixedly mount the holder on the bracket.

14 Claims, 7 Drawing Sheets

EXTRACTING APPARATUS FOR STORAGE MODULE

BACKGROUND

1. Technical Field

The present invention relates to extracting apparatuses and, more particularly, to an extracting apparatus for a data storage module.

2. Description of Related Art

An electronic apparatus, such as a desktop computer, tower computer, or server, for example, usually include storage modules, such as hard disk drives, compact disk read-only memory (CD-ROM) drives, digital video disc (DVD) drives, and floppy disk drives, for example. These devices are typically added to increase the functionality of the electronic apparatus as desired by a user.

The installation of a hard disk drive in a computer typically involves the use of screws to attach the hard disk drive to a bracket. A storage module including the hard disk drive and the bracket is formed, which is extractably mounted in a computer chassis. The extracting apparatus includes a handle for operating the storage module, and the handle generally includes an elongated arm for easy removal. However, the elongated arm consumes space.

DETAILED DESCRIPTION

Figure 1:
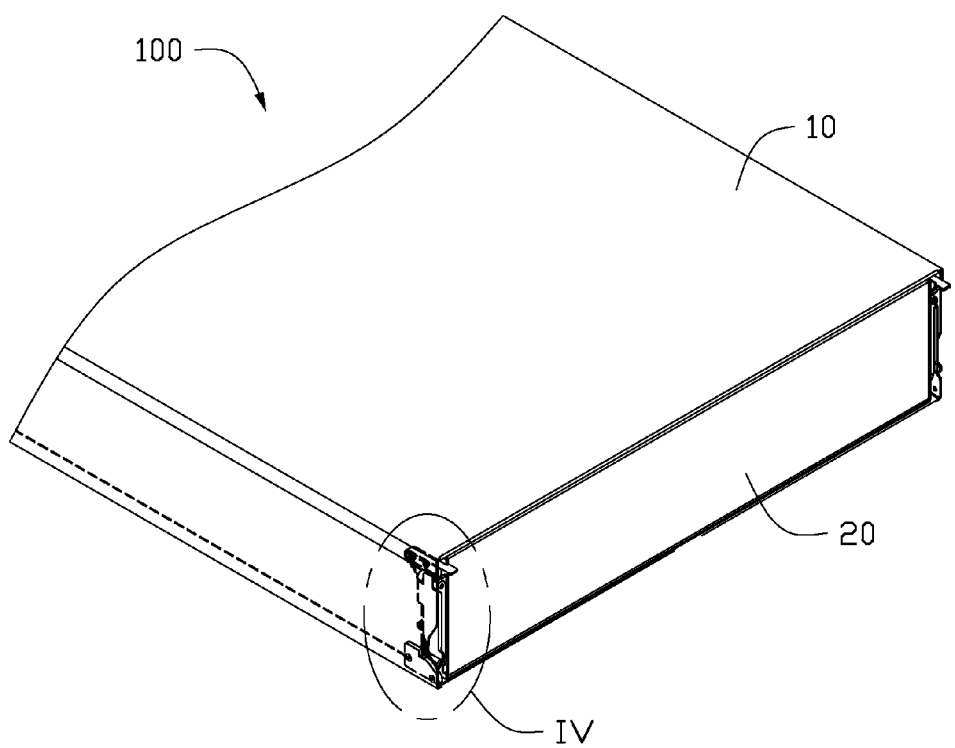
FIG. 1 is a partially assembled view of an exemplary embodiment of an extracting apparatus and a storage module.

Referring to FIG. 1, an exemplary embodiment of an extracting apparatus 100 includes a bracket 10 and a holder 20 extractable and mounted to the bracket 10. The bracket 10 can be mounted in an electronic device (not shown), such as a server or a computer. The holder 20 receives a storage module (not labeled) therein, thereby facilitating the extractable mounting of the storage module together with the holder 20 into the electronic device.

Figure 2:
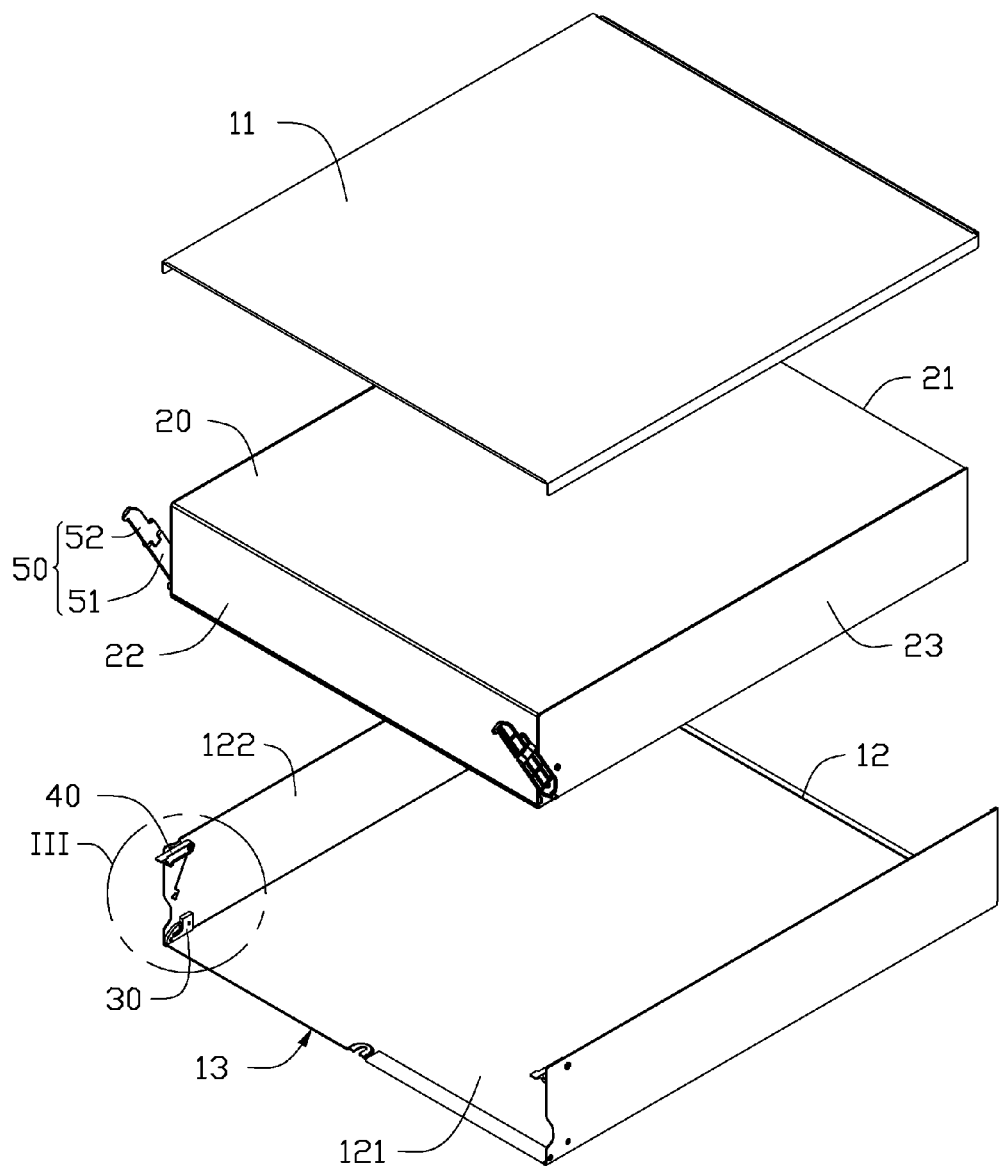
FIG. 2 is a disassembled view of FIG. 1.
Figure 3:
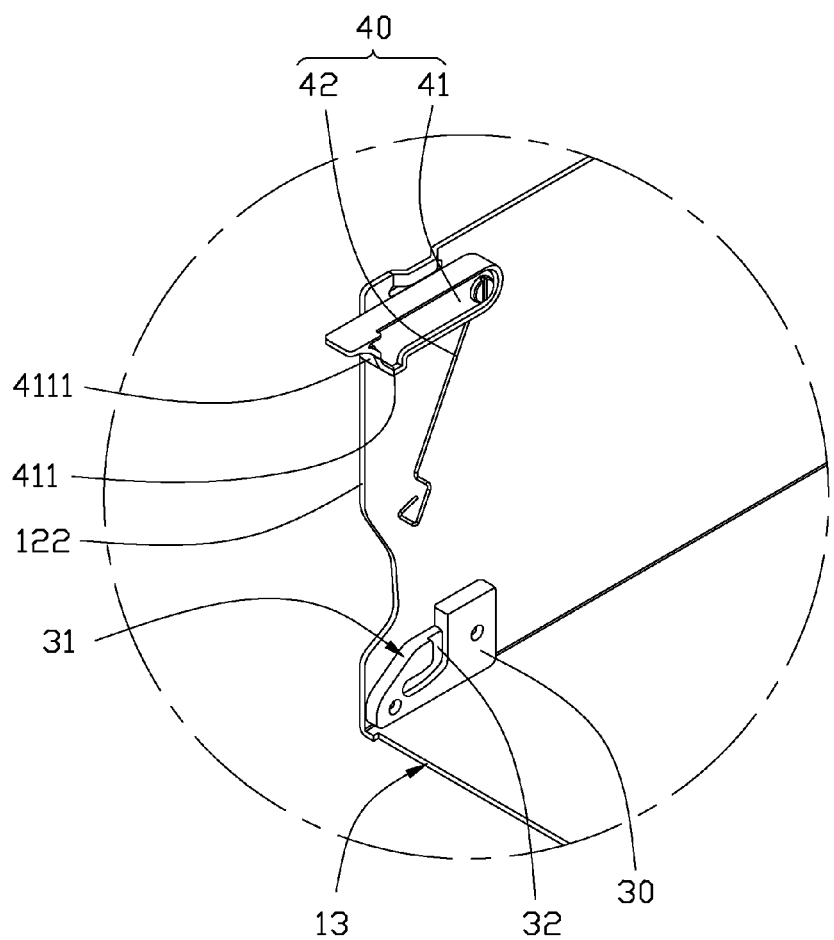
FIG. 3 is an enlarged view of III of FIG. 2.

Referring to FIGS. 2 to 3, the bracket 10 includes an upper cover 11 and a bottom cover 12. The bottom cover 12 includes a bottom plate 121 and two side plates 122 respectively extending upwards from opposite sides of the bottom plate 121. The bottom plate 121 and the side plates 122 cooperatively define an opening 13 for receiving the holder 20. The bottom cover 12 further includes a limiting portion 30 arranged on a front end of a junction of the bottom plate 121 and one of the side plates 122, and a fastener 40 arranged on the other one of the side plates 122 opposite to the limiting portion 30.

The limiting portion 30 defines a cutout 31 at a front, upper corner thereof. The limiting portion 30 includes an L-shaped guideway 32. The guideway 32 includes a first part communicating with the cutout 31 and a second part perpendicular to the first part, and the second part of the guideway 32 is approximately parallel to the bottom plate 121.

The fastener 40 includes a latch member 41 pivotably connecting with the side plate 122 and an elastic member 42. A first end of the latch member 41 is pivotably connected with the side plate 122, and a second end thereof is a free end. A locking part 411 is formed on a bottom portion of the second end the latch member 41. The locking part 411 includes a slanted surface 4111 at a front bottom end. The elastic member 42 is a spring with a first end elastic member 42 fixed on the latch member 41, and a second end bent toward the limiting portion 30.

Figure 4:
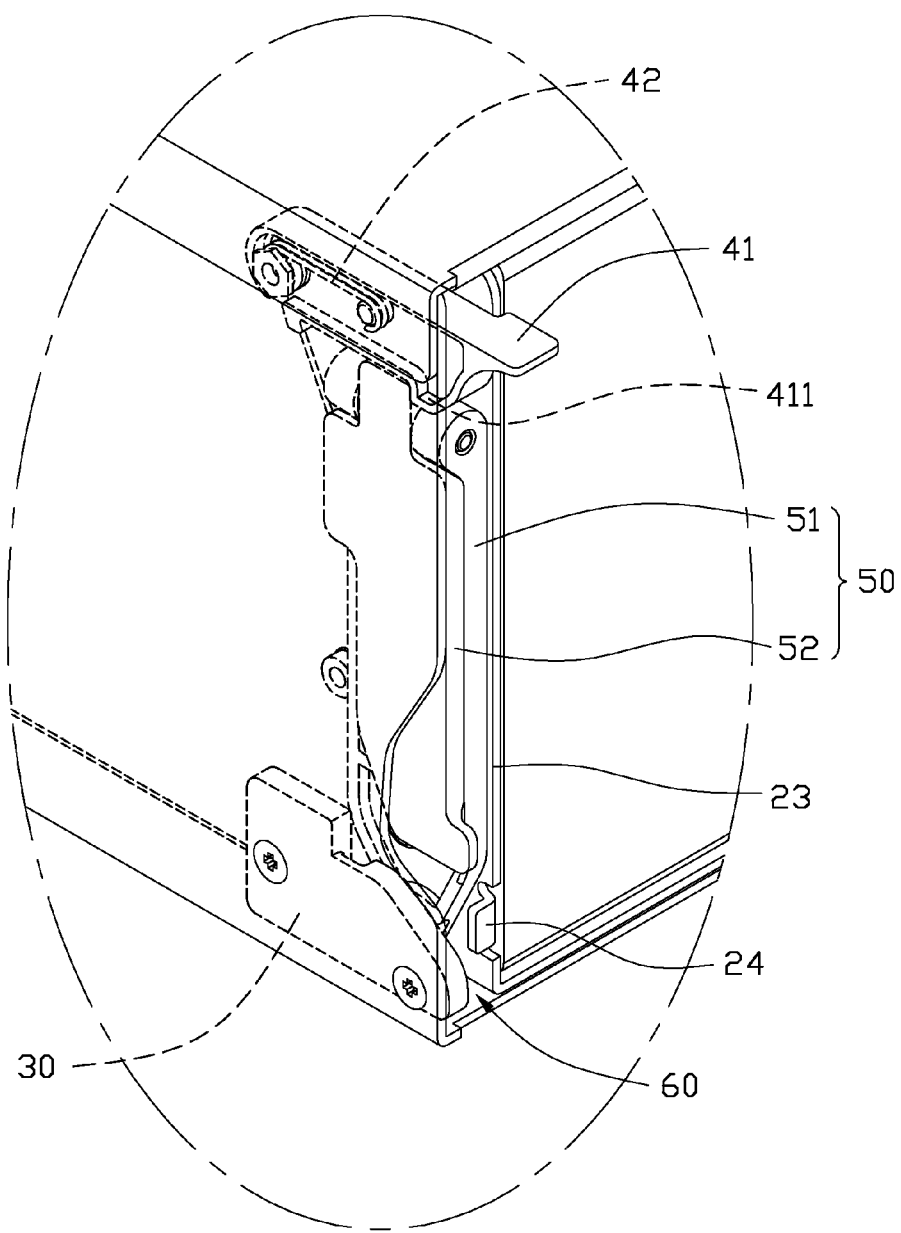
FIG. 4 is an enlarged view of IV of FIG. 1.
Figure 5:
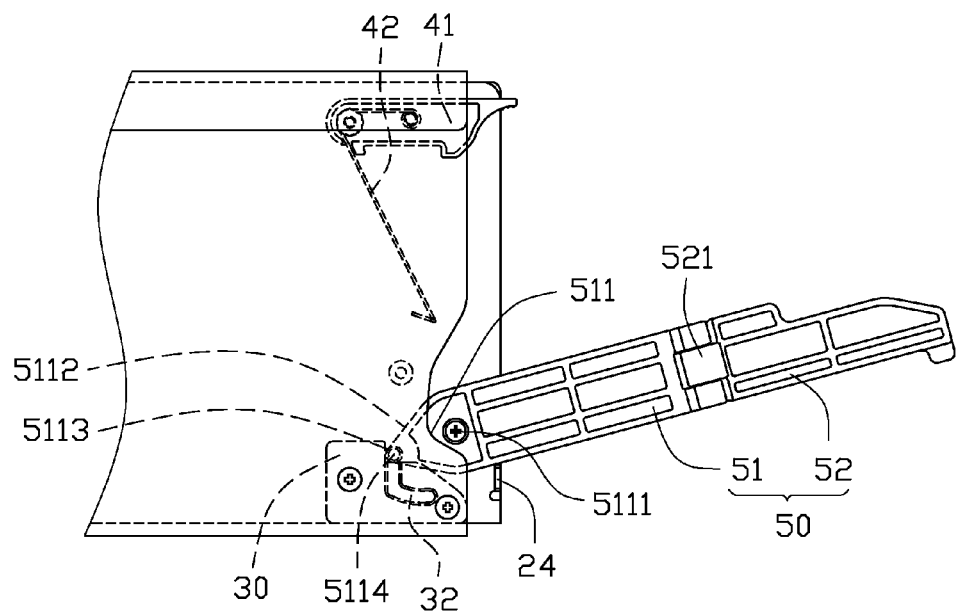
FIGS. 5-7 are perspective side views of FIG. 1 with assembling the extracting apparatus.
Figure 6:
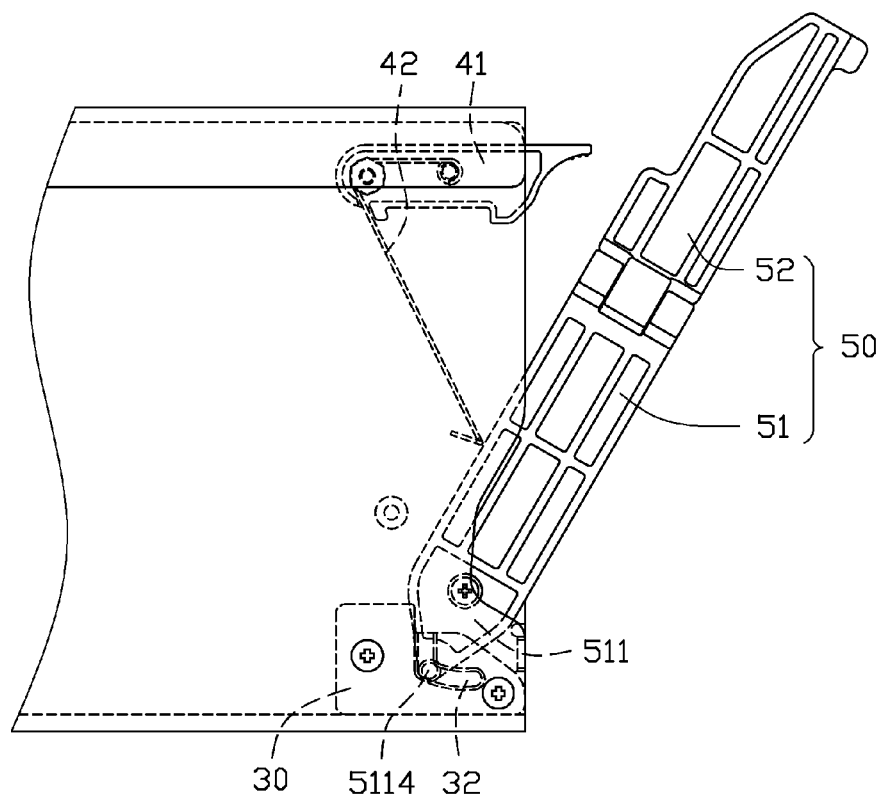
Figure 7:
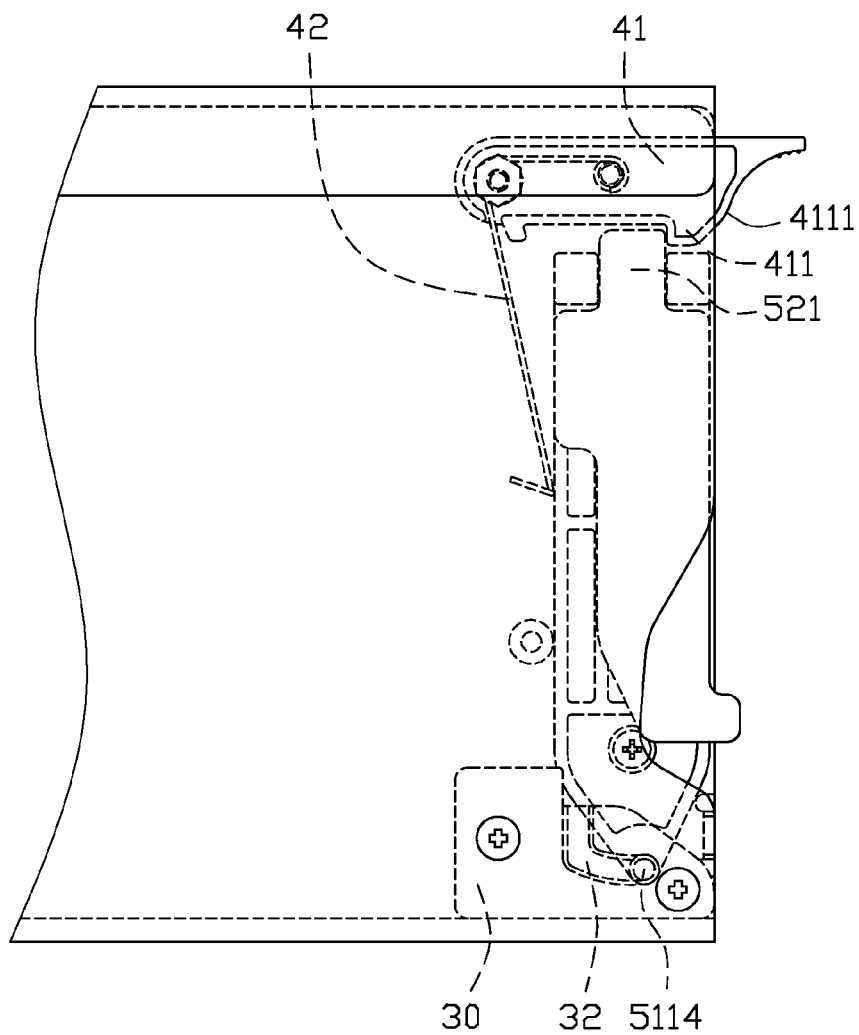

Referring also to FIGS. 4 to 5, the holder 20 includes a front wall 22, a rear wall 21 opposite to the front wall 22, and two side walls 23 connected to the front wall 22 and the rear wall 21. The holder 20 includes two handles 50 pivotably connecting front ends of the side walls 23. A width between the side plates 122 is larger than that between the side walls 23.

The handle 50 includes an arm 51 pivotably connecting with the side wall 23, and an operating portion 52 pivotably connecting with the arm 51. The arm 51 has a triangular-shaped cam 511. The cam 511 includes a pivot portion 5111 and two sides 5112 arranged at two opposite sides of the pivot portion 5111. The two sides 5112 intersect each other and form a point 5113. A distance between the pivot portion 5111 and the point 5113 is larger than the distance between pivot portion 5111 and the sides 5112. A pole 5114 is fixed on the point 5113 perpendicular to the cam 511. The operating portion 52 includes a projection 521 at a pivotal junction of the operating portion 52 and the arm 51. The operating portion 52 is operated to rotate until folded to abut the arm 51. The projection 521 protrudes to an outmost side of the arm 51. The locking part 411 of the latch member 41 locks the projection 521 of the operating portion 52; therefore, the holder 20 is fixed on the bracket 10.

In the present embodiment, the holder 20 further includes a blocking portion 24 arranged at a lateral side of the side wall 23. The blocking portion 24 blocks the handle 50.

In assembly of the holder 20 with the bracket 10, the rear end of the holder 20 is inserted in the bracket 10. The handle 50 is rotated and the operating portion 52 extends beyond the bracket 10. The holder 20 is pulled into the bracket 10 by the handle 50 until the point 5113 abuts the limiting portion 30. The operating portion 52 of the handle 50 is operated to rotate until abutting the arm 51, and the projection 521 protrudes to an outmost side of the arm 51. Then the handle 50 is rotated, and the pole 5114 slides along the first part of the guideway 32 until reaching a bottom of the first part of the guideway 32, then the latch potion 41 is rotated to make the locking part 411 latch the projection 521 of the handle 50. In this locked position, the free end of the elastic member 42 abuts the operating portion 52 of the handle 50 and the pole 5114 slides along the second part of the guideway 32 by an elastic force of the elastic member 42 until the pole 5114 abuts an end of the guideway 32. Therefore, the holder 20 is fixed on the bracket 10.

It is to be understood, however, that even though numerous characteristics and advantages of various embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An extracting apparatus for storage module, comprising:
   a bracket comprising a fastener; and
   a holder withdrawable mounted to the bracket, the holder being for fixing the storage module, the holder comprising a handle, the handle comprising an arm pivotably connecting with the holder and an operating portion pivotably connecting with the arm, the operating portion being operated to fold to abut the arm, and the fastener latching the handle to fixedly mount the holder on the bracket;

wherein the fastener comprises a latch member pivotably connecting with the bracket, the latch member comprising a locking part at a free end of thereof, the locking part being configured for latching the handle.

2. The extracting apparatus of claim 1, wherein the operating portion comprises a projection at a pivotal junction of the operating portion and the arm, the operating portion being operated to abut the arm, the fastener latching the projection of the handle.

3. The extracting apparatus of claim 1, wherein the bracket further comprises a limiting portion opposite to the fastener for locking the arm of the handle.

4. The extracting apparatus of claim 3, wherein the handle further comprises a cam connected to the arm and away from the operating portion, the cam comprising a pivot portion for pivotably connecting with the holder.

5. The extracting apparatus of claim 4, wherein the limiting portion comprises a guideway, a pole being fixed on a free end of the cam, the pole being slidable along the guideway.

6. The extracting apparatus of claim 1, wherein the holder further comprises a blocking portion being configured for blocking the handle.

7. The extracting apparatus of claim 1, wherein the bracket comprises a bottom plate and two side plates respectively extending upwards from opposite sides of the bottom plate, the fastener being pivotably connected with the side plate of the bracket.

8. The extracting apparatus of claim 7, wherein the holder comprises a front wall, a rear wall opposite to the front wall, and two side walls connected to the front wall and the rear wall, the handle being pivotably connected with the side wall of the holder.

9. The extracting apparatus of claim 7, wherein a width between the side plates of the bracket is larger than that of the side walls of the holder.

10. An extracting apparatus, comprising:
a bracket comprising a fastener pivotably connecting with the bracket, the fastener comprising a locking portion at a free end thereof; and
a holder extractably mounted to the bracket, the holder being for fixing a storage module, the holder comprising a handle, the handle comprising an arm pivotably connecting with the holder and an operating portion pivotably connecting with the arm, a projection being arranged at a pivotal junction of the operating portion and the arm, the operating portion being operated to fold to abut the arm, and the locking portion latching the projection of the handle;
wherein a pole is arranged at a free end thereof, the bracket further comprising a limiting portion opposite to the fastener, the limiting portion defining a guideway, a pole being fixed on a free end of the cam, the pole being slide along the guideway.

11. The extracting apparatus of claim 10, wherein the handle further comprising a cam connected to the arm and away from the operating portion, the cam comprising a pivot portion for pivotably connecting with the holder.

12. The extracting apparatus of claim 10, wherein the bracket comprises a bottom plate and two side plates respectively extending upwards from opposite sides of the bottom plate, the fastener being pivotably connected with the side plate of the bracket.

13. The extracting apparatus of claim 10, wherein the holder comprises a front wall, a rear wall opposite to the front wall, and two side walls connected to the front wall and the rear wall, the arm of the handle being pivotably connected with the side wall of the holder.

14. An extracting apparatus for storage module, comprising:
a bracket comprising a fastener; and
a holder withdrawable mounted to the bracket, the holder being for fixing the storage module, the holder comprising a handle, the handle comprising an arm pivotably connecting with the holder and an operating portion pivotably connecting with the arm, the operating portion being operated to fold to abut the arm, and the fastener latching the handle to fixedly mount the holder on the bracket;
wherein the bracket further comprises a limiting portion opposite to the fastener for locking the arm of the handle.

* * * * *